Oct. 12, 1943.  J. E. SNYDER  2,331,742

METHOD OF LAMINATING RUBBER HYDROCHLORIDE FILMS

Filed April 16, 1941

Inventor
James E. Snyder

By

Attorney

UNITED STATES PATENT OFFICE 2,331,742

METHOD OF LAMINATING RUBBER HYDROCHLORIDE FILMS

James E. Snyder, Akron, Ohio, assignor to Wingfoot Corporation, Akron, Ohio, a corporation of Delaware Application April 16, 1941, Serial No. 388,715

1 Claim. (Cl. 154—2)

This invention relates to the formation of a new rubber hydrochloride film.

For some time considerable quantities of process cheese have been packaged in rubber hydrochloride film. The usual untreated rubber hydrochloride film has not been entirely satisfactory for this purpose. The housewife is used to cutting off slices of the cheese as required and keeping the block from which slices have been cut in cold storage. The usual untreated film does not adhere tightly to the cheese and after a slice has been cut from the block of cheese, air enters between the cheese and the wrapper and mold may form on the cheese. Also this poor "cling" causes trouble in slicing.

If a waxy substance is added to the film in an amount in excess of that required to saturate the film, so that there is a bloom of the waxy substance on the surface of the film, the film adheres to the cheese. In order to get good adherence it is necessary to add so much waxy material to the film that it is difficult to print on the film with the inks ordinarily employed in this type of printing. It is desirable to use a film with the heavy bloom obtained when sufficient wax is used to cause a bloom on both sides, because this gives better cling to the cheese. However, the hazy outer surface is unattractive in appearance, and printing is almost impossible because of the wax on the surface. Furthermore, the sheet which contains so much wax is not as impervious to vapors and odors, etc., as an untreated rubber hydrochloride film and it has been noticed that when a rubber hydrochloride film of high wax content is used for packaging process cheese and the wrapped package is enclosed in a pine box, pine vapors from the box pass through the film and contaminate the cheese.

According to this invention a rubber hydrochloride film saturated with a waxy substance and having a bloom of the waxy substance thereon is laminated to a film (preferably a relatively clear, rubber hydrochloride film) containing no wax, or substantially no wax. This composite sheet may be used for packaging a variety of materials but is designed particularly for the packaging of process cheese. The laminated film is preferably first made into a bag with the wax-containing film forming the inner surface of the bag, and the process cheese is run hot into this bag. The bag is then sealed in the usual way. The outer ply of this bag is substantially wax free. The package thus formed may be enclosed in a cardboard carton or in a wooden box or may be included in any other suitable outer container.

When the wax-containing film is formed by casting on a belt, if the rubber hydrochloride contains only a small amount of wax in excess of that which can be retained by the rubber hydrochloride, this excess will "bloom" out on the surface of the film adjacent the belt. When a large amount of wax is used the coating formed on the surface of the film adjacent the belt will be heavier than that on the opposite surface.

In laminating the wax-containing film to the other film, it will be the surface of the wax-containing film which carries no wax, or the lesser amount of wax, which will be united to the other ply of film.

In uniting the waxy and non-waxy sheets it has been found desirable to apply most or all of the heat used for the lamination through the non-waxy sheet, as by passing the two sheets over a heated roll with the non-waxy sheet in contact with the roll. This forces some of the wax from the wax-containing sheet to the outer surface of the laminated structure, thereby increasing the thickness of the wax coating on the sheet.

The non-waxy film may be printed, and this printing may be done before or after the lamination. If the non-waxy film is printed before lamination to the wax-containing film, the printed surface may advantageously be brought into contact with the wax-containing film. Such reverse printing is desirable for several reasons. For one thing, there is no printing on the surface of the film and it is therefore particularly suited for the packaging of greasy or wet foodstuffs, since the printing cannot rub off or off-set onto contacting surfaces. This is a desirable method of preparing printed film even though the wax-containing film is not saturated with a waxy substance and is free from any wax bloom.

The wax-containing film will preferably contain a maximum amount of wax or other waxy substance. It may, for example, contain 30 or 40 or 50%. The wax employed is preferably an amorphous, such as "SS" wax made by National Wax Co., Chicago, although other waxes may be used such as Petrowax "A" made by Biwax Corp., Chicago, Syncera, Cerese and beeswax.

The non-waxy film may be an unplasticized film, or it may be film which contains butyl stearate, dibutyl phthalate, dibutyl sebacate or other suitable plasticizer or a mixture of plasticizers. A 2½% or 5% butyl stearate-containing film is suitable and larger amounts of plasticizer may be used and light inhibitors may be added.

A laminated film around about .0015 inch thick will form a suitable covering for most packaging operations although thicker or thinner films may be used. The two sheets which are laminated together to form the composite sheet of this invention may be the same thickness or different thicknesses. For example, the sheet of rubber hydrochloride film sold on the market as Pliofilm NOVW which is a rubber hydrochloride film saturated with an amorphous wax and coated with a bloom of wax, which film is .0007 inch thick, may be laminated to a sheet of Pliofilm NO which contains no plasticizer and which is also .0007 inch thick. The Pliofilm NOVW is formed by adding 30% of amorphous wax to a rubber hydrochloride cement (based on solids content) which may be a benzene cement. The mixture is cast into the film. On evaporation of the solvent the rubber hydrochloride is saturated with the wax and the excess wax forms a bloom on the under surface of the film adjacent the casting surface. A film of Pliofilm NOVW .0007 inch thick may be laminated to a sheet .0007 inch thick of Pliofilm P-4 which is rubber hydrochloride film which contains approximately 10% of butyl stearate. As another example, a sheet of the said wax-containing film .0007 inch thick may be laminated to a sheet .0008 inch thick of Pliofilm N2 which is rubber hydrochloride film which contains approximately 5% of butyl stearate. Either film may, if desired, contain a photochemical inhibitor, although this is not necessary. Films of different gauges may be used and may be united to films of different composition. In fact the outer ply need not be rubber hydrochloride film. It may, for example, be a cellulosic film such as a regenerated cellulose sheet or glassine or a sheet of cellulose acetate or ethyl cellulose or other cellulose ester or ether. It may be a film of polymerized vinyl derivative such as a film of Koroseal or Vinylite or the like. Any other transparent film may be used. Adhesive may be used for uniting the films, but preferably the films are united by merely pressing them together with sufficient heat to unite them.

The invention will be further described in connection with the accompanying drawing in which.

Figure 1:
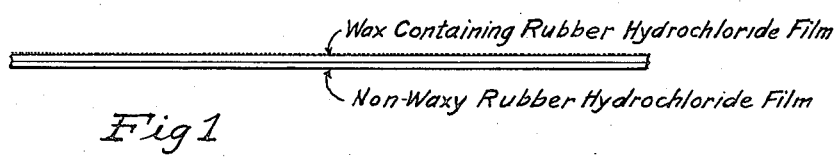
Fig. 1 is an elevation of an unprinted, laminated sheet of this invention.

As shown in Fig. 1 the two plies of film are united directly without an adhesive. The one side of the composite sheet contains so much wax that there is a bloom of wax, and preferably a heavy bloom, on the surface. This is softened as the hot cheese is brought in contact with it and the cheese and film adhere to one another.

Figure 2:
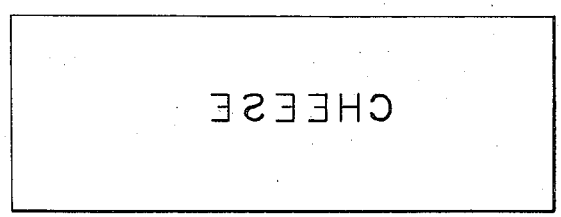
Fig. 2 is a printed sheet, the printing being on the non-waxy component.
Figure 3:
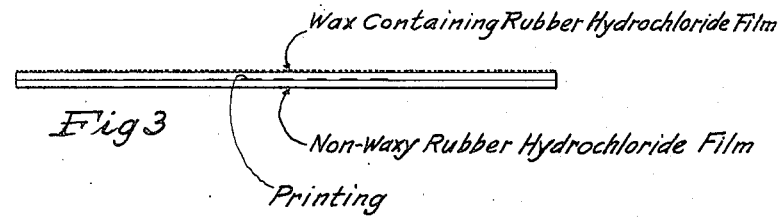
Fig. 3 is an elevation of the printed sheet shown in Fig. 2.

Figs. 2 and 3 illustrate the preferred way of printing such film. The printing is between the two films, as shown in Fig. 3. The wax bloom on the wax-containing film makes it unprintable. The non-waxy film is printed and then the printed surface is united to the wax-containing film by heat and pressure.

Figure 4:
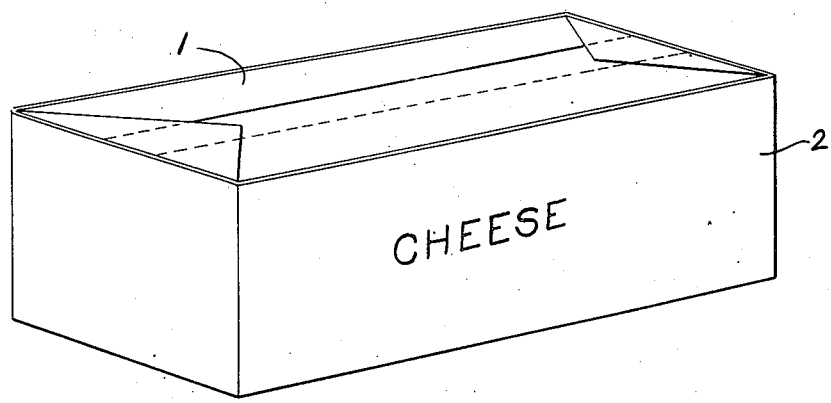
Fig. 4 shows a brick of process cheese wrapped in the film.

Fig. 4 shows a package of process cheese wrapped in the film 1. The wrapped cheese is put in a pine box 2. The cover is then nailed down. The wax-containing side of the composite film 1 is next to the cheese and the non-waxy side of the film which is non-pervious to vapors protects the cheese from the pine vapors.

The composite sheet may be used for wrapping other materials, such as chili con carne, head cheese, cooked, spiced beef, souse, scrapple, peanut butter, cream cheese, cheese foods, etc.

My United States Patent 2,307,081 claims a rubber film saturated with wax and coated on one side with a thin coating of wax and on the other side with a heavier coating of wax and also claims the process of making such a sheet by casting.

What I claim is:

The method of laminating a non-waxy rubber hydrochloride film to a wax-containing rubber hydrochloride film by heat and pressure to produce a laminated sheet of wax-containing rubber hydrochloride and rubber hydrochloride which is substantially wax free, which comprises supplying sufficient heat for the lamination through the non-waxy film to force some wax from the wax-containing film to the exposed surface thereof and to form a coating of wax thereon while keeping the non-waxy ply substantially wax free.

JAMES E. SNYDER.